(12) United States Patent
Dewa (10) Patent No.: US 6,704,132 B2
(45) Date of Patent: Mar. 9, 2004

(54) MICROMIRROR TRUSS STRUCTURE AND FABRICATION METHOD

(75) Inventor: Andrew S. Dewa, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/026,318

(22) Filed: Dec. 20, 2001

(65) Prior Publication Data

US 2003/0117685 A1 Jun. 26, 2003

(51) Int. Cl.[7] .................. G02B 26/00; G02B 26/08; G02B 26/02
(52) U.S. Cl. .................. 359/290; 359/291; 359/298; 359/223; 359/224; 359/230
(58) Field of Search .................. 359/290, 291, 359/298, 214, 224, 230, 198, 223, 213; 310/36, 90; 73/504.02, 504.12; 335/222, 223, 229; 385/18; 141/1; 501/88; 250/234; 216/22

(56) References Cited

U.S. PATENT DOCUMENTS

| | | | | |
|---|---|---|---|---|
| 5,498,312 A | | 3/1996 | Laermer et al. | |
| 5,606,447 A | * | 2/1997 | Asada et al. | 359/199 |
| 6,295,154 B1 | * | 9/2001 | Laor et al. | 359/223 |
| 6,430,332 B1 | * | 8/2002 | Laor et al. | 385/18 |
| 2001/0022682 A1 | * | 9/2001 | McClelland et al. | 359/280 |
| 2002/0018615 A1 | * | 2/2002 | Laor et al. | 385/18 |
| 2002/0034024 A1 | * | 3/2002 | Orcutt et al. | 359/846 |
| 2002/0034026 A1 | * | 3/2002 | Orcutt et al. | 359/877 |
| 2002/0070335 A1 | * | 6/2002 | Orcutt et al. | 250/234 |
| 2002/0074310 A1 | * | 6/2002 | Dewa | 216/22 |
| 2002/0075553 A1 | * | 6/2002 | Orcutt | 359/290 |
| 2002/0118429 A1 | * | 8/2002 | Miyajima et al. | 359/224 |

* cited by examiner

Primary Examiner—Georgia Epps
Assistant Examiner—Jack Dinh
(74) Attorney, Agent, or Firm—Charles A. Brill; Wade James Brady, III; Frederick J. Telecky, Jr.

(57) ABSTRACT

A micromirror (110) includes a frame portion (112), a gimbal portion (114) and a mirror portion (116) formed from a single piece of material. A plurality of truss members (140/142) are disposed beneath the gimbal portion (114) and mirror portion (116), allowing the gimbal and mirror portions (114/116) to be made of a thinner material, reducing the mass and increasing the resonant frequency of the micromirror device (110).

30 Claims, 5 Drawing Sheets

MICROMIRROR TRUSS STRUCTURE AND FABRICATION METHOD

TECHNICAL FIELD

This invention relates generally to micromechanical systems, and more particularly to a micromirror device.

BACKGROUND

There are a variety of different types of micromechanical devices, including micro-motors, micro-gears, and micromechanical deformable mirror devices (DMD's). Micromechanical DMD's contain an activation or addressing electrode, a support post or posts, underneath a hinge or hinges, which in turn supports a deflection element suspended over the electrode. The DMD's are primarily used in the direction of light in optical systems, with a mirrored deflection element. The operation of such devices involves activating the electrode, which builds up electrostatic charge in the gap between electrode and deflection element. The deflection element then flexes on its hinge or hinges and moves towards the electrode. When the charge is removed, the deflection element returns to its undeflected position. MEM micromirrors are used to build digital micromirror display (DMD) devices where the mirrors rotate about a single axis by an electrostatic drive.

In recent years, optical fibers have come into widespread use in a wide variety of applications, in which optical signals are transmitted along such fibers and are switched from one fiber to another by means of an optical switch. An optical switch and micromirror used therein is described in U.S. Pat. No. 6,295,154, issued on Sep. 25, 2001 to Laor, et al., incorporated herein by reference. The micromirror includes two axes of motion and is driven magnetically, e.g., by coils disposed under magnets on the micromirror. The micromirror is made from a single piece of crystal material such as silicon and has three portions connected by two sets of hinges, with an inner portion forming the mirror. One of the hinge pairs, one hinge on each of two opposite sides of the mirror portion, ties the mirror portion and the middle gimbals portion, which surrounds the mirror portion. This allows the mirror portion to rotate about the gimbals portion, providing the first axis of rotation. The second set of hinges ties the gimbals portion and the frame portion, one hinge on each of two opposite sides on a line disposed, e.g., 90 degrees relative to a line drawn through the first set of hinges. This allows the gimbals portion, which carries the mirror, to rotate about the frame portion, providing a second axis of rotation.

In the micromirror device disclosed in U.S. Pat. No. 6,295,154, because there are two axes of rotation, the micromirror may be deflected +/− around 8 degrees, in both directions from the surface normal in a plurality of positions, and is therefore sometimes referred to as an analog micromirror device. The analog micromirror device mirror portion can move to a nearly infinite number of positions within the +/−8 degrees in both axes, and is limited only by the resolution of the electronics that drive the coils.

SUMMARY OF THE INVENTION

Embodiments of the present invention achieve technical advantages by disclosing a micromirror device having around one-tenth the thickness of prior art micromirror devices, achieving a higher resonant frequency, in the order of thousands of Hertz. The decreased thickness is possible due to the use of a plurality of trusses disposed beneath at least a mirror portion of the micromirror device. The micromirror device may be used in optical switching systems, increasing the switching speed of optical switches, devices and networks.

In one embodiment, disclosed is a micromirror device, comprising an outer frame portion, a rotational gimbal portion hinged to the frame portion and moveable relative to the frame portion about a first axis, and an inner rotational mirror portion having a reflective upper face surface hinged to the gimbal portion for movement of the mirror portion relative to the gimbal portion about a second axis. A plurality of truss members are disposed beneath at least the inner rotational mirror portion.

In another embodiment, a micromirror device is disclosed, comprising an outer frame portion, a rotational gimbal portion hinged to the frame portion and moveable relative to the frame portion about a first axis, and an inner rotational mirror portion having a reflective upper face surface hinged to the gimbal portion for movement of the mirror portion relative to the gimbal portion about a second axis. A plurality of truss members are disposed beneath the inner rotational mirror portion and the gimbal portion, wherein at least the gimbal portion and mirror portion are formed from a single piece of material.

Further disclosed is a method of manufacturing a micromirror device, the method comprising providing a silicon on insulator (SOI) wafer having a first layer bonded to a second layer, a thin oxide layer being disposed between the first and second layers, wherein the second layer is thicker than the first layer. The method includes removing a portion of the second layer to define a truss member height in the second layer, and patterning and etching the truss member height defined areas of the second layer to form a plurality of truss members. The first layer is patterned and etched to form a frame portion, a gimbal portion disposed within the frame portion, and a mirror portion disposed within the gimbal portion.

Advantages of embodiments of the present invention include reducing the mass of the mirror portion and gimbal portion of a micromirror device, which increases the resonant frequency, allowing the micromirror device to move faster. Larger micromirror devices can be manufactured, having higher resonant frequencies. Furthermore, standard SOI wafers may be used to manufacture the micromirror device, reducing cost and avoiding the manufacture of custom SOI wafers.

BRIEF DESCRIPTION OF THE DRAWINGS

The above features of embodiments of the present invention will be more clearly understood from consideration of the following descriptions in connection with accompanying drawings in which.

Corresponding numerals and symbols in the different figures refer to corresponding parts unless otherwise indicated. The figures are drawn to clearly illustrate the relevant aspects of the preferred embodiments and are not necessarily drawn to scale.

DETAILED DESCRIPTION OF PREFERRED EMBODIMENTS

A prior art micromirror is discussed, followed by a description of preferred embodiments of the present invention and a discussion of some advantages of embodiments of the present invention.

Figure 1:
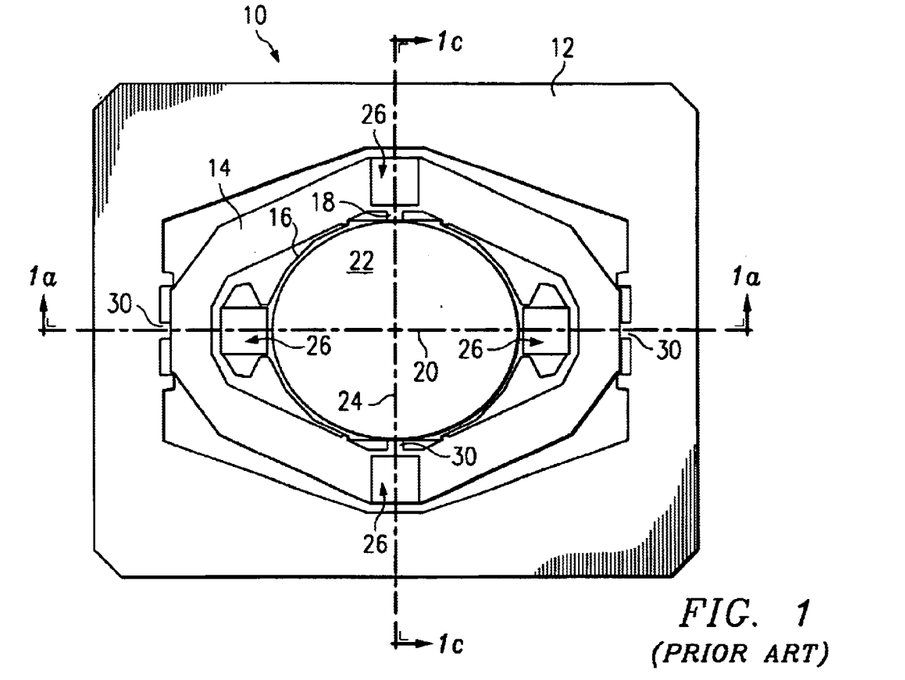
FIG. 1 illustrates a plan view of a mirror assembly used in the FIG. 2 switch unit.

A micromirror assembly 10 disclosed in U.S. Pat. No. 6,295,154 is shown in FIG. 1. The micromirror assembly 10 includes a frame portion 12, an intermediate gimbals portion 14 and an inner mirror portion 16 preferably formed from one piece of crystal material, such as silicon. The silicon is etched to provide an outer frame portion 12, forming an opening in which intermediate annular gimbals portion 14 is attached at opposing hinge locations 18 along a first axis 20. An inner, centrally disposed mirror portion 16, having a mirror 22 centrally located thereon, is attached to the gimbals portion 14 at hinge portions 18 on a second axis 24, where the second axis 24 is positioned 90 degrees from the first axis 20. The mirror 22, which is on the order of 100 microns in thickness, is suitably polished on its upper surface to provide a specular surface. In order to provide necessary flatness, the mirror 22 is formed with a radius of curvature greater than approximately 2 meters, with increasing optical path lengths requiring increasing radius of curvature. The mirror 22 radius of curvature can be controlled by known stress control techniques such as by polishing on both opposite faces and deposition techniques for stress controlled thin films. A coating of suitable material can be placed on the mirror portion 16 to enhance its reflectivity for specific radiation wavelengths.

The mirror assembly 10 also comprises a first pair of permanent magnets 26 mounted on gimbals portion 14 along the second axis 24 and a second pair of permanent magnets 26 is mounted on extensions 28, which extend outwardly from mirror portion 16 along the first axis 20. In order to symmetrically distribute mass about the two axes 20/24 of rotation to thereby minimize oscillation under shock and vibration, each permanent magnet 26 preferably comprises a set of an upper magnet 26a mounted on the top surface of the mirror assembly 10 using conventional attachment techniques such as epoxy bonding, and an aligned lower magnet 26b similarly attached to the lower surface of the mirror assembly 10 as shown in FIGS. 1a–1d. The magnets of each set are arranged serially such as the north/south pole arrangement indicated in FIG. 1c. There are several possible arrangements of the four sets of magnets which may be used, such as all like poles up, or two sets of like poles up, two sets of like poles down; or three sets of like poles up, one set of like pole down, depending upon magnetic characteristics desired.

By mounting gimbals portion 14 to frame portion 12 by means of hinges 30, motion of the gimbals portion 14 about the first axis 20 is provided and by mounting mirror portion 16 to gimbals portion 14 via hinges 30, motion of the mirror portion 16 relative to the gimbals portion 14 is obtained about the second axis 24, thereby allowing independent, selected movement of the mirror portion 16 along two different axes 20/24.

Figure 1A:
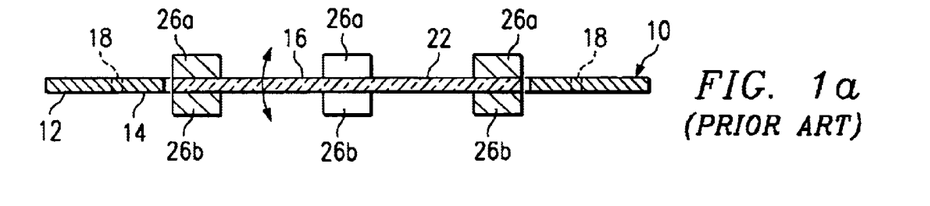
FIG. 1a is a cross sectional view taken on line 1a—1a of FIG. 1.
Figure 1B:
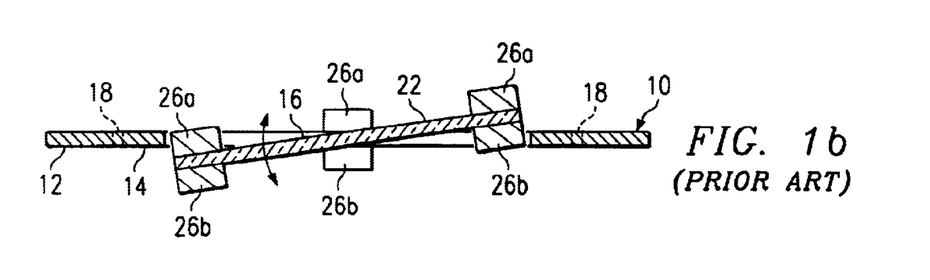
FIG. 1b is a view similar to FIG. 1a but showing rotation of the mirror portion of the mirror assembly.
Figure 1C:
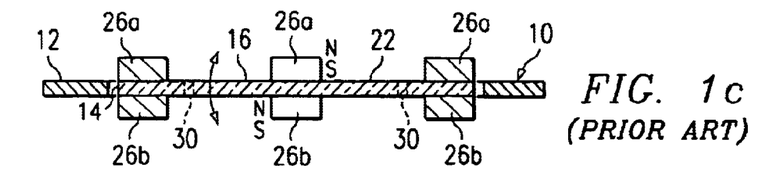
FIG. 1c is a cross sectional view taken on line 1c—1c of FIG. 1.
Figure 1D:
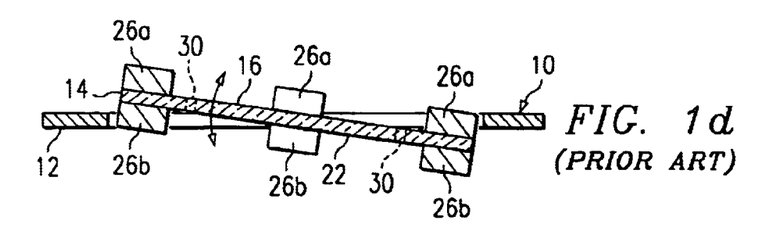
FIG. 1d is a view similar to FIG. 1c but showing rotations of the gimbals portion of the mirror assembly.

The middle or neutral position of the mirror assembly 10 is shown in FIG. 1a, which is a section taken through the assembly along line 1a—1a of FIG. 1. The rotation of the mirror portion 16 about the second axis 24 independent of the gimbals portion 14 and/or the frame portion 12 is shown in FIG. 1b as indicated by the arrow. FIG. 1c shows the middle position of the mirror assembly 10, similar to that shown in FIG. 1a, but taken along line 1c—1c of FIG. 1. The rotation of the gimbals portion 14 and minor portion 16 about the first axis 20 independent of frame portion 12 is shown in FIG. 1d as indicated by the arrow. The above independent rotation of the minor 22 of minor portion 16 about the two axes 20/24 allows direction of an optical beam, as needed by optical switch units.

A problem with the micromirror assembly 10 shown in FIG. 1 is that the thickness of the mirror portion 16, gimbal portion 14 and frame portion 12 is relatively thick, e.g., 100 micrometers, which limits the resonant frequency and/or switching speed of the micromirror to a few hundred Hertz, for example. Prior art micromirrors 10 are fabricated out of a solid sheet of silicon, around 115 micrometers thick, for example.

What is needed is a micromirror device having thinner mirror and gimbal portions, in order to produce a micromirror device having a higher resonant frequency and thus being able to switch or move the mirror portion more quickly.

Another problem with prior art micromirrors is that the trend in certain applications is towards increased sizes of the mirror portion 16. For example, in optical wireless communications, e.g. between buildings, a large beam is desired, because if a bird files through the beam, data may be lost. Unfortunately, the larger the mirror portion 16, the slower it moves. Using the current method of manufacturing micromirror devices, making a micromirrors larger, such as 2×2.4 mm or larger, for example, would have a resonant frequency of only about 5 hertz.

Therefore, what is needed in the art is a method of reducing the mass of the moving portions of larger micromirror devices, so the mirror portion can move faster.

Figure 2:
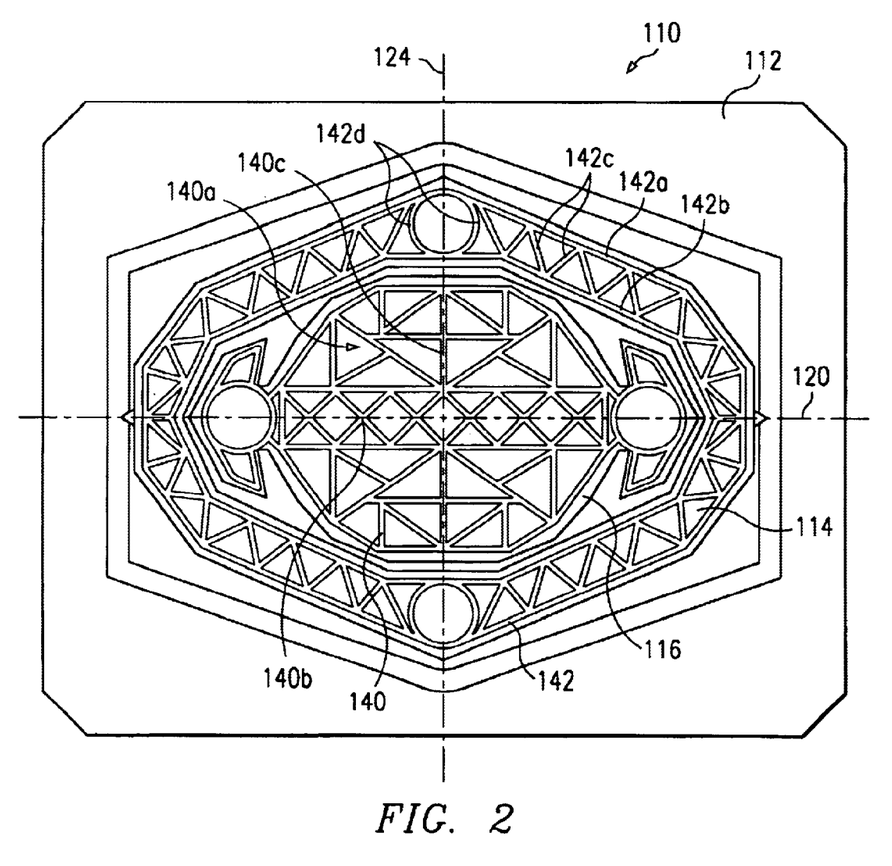
FIG. 2 shows a back view of a micromirror device in accordance with an embodiment of the present invention, having a plurality of trusses disposed beneath the mirror portion and gimbal portion.

Embodiments of the present invention achieve technical advantages by providing a micromirror device 110 having a reduced mass than prior art micromirrors, increasing the speed at which the mirror portion 116 may be moved. FIG. 2 shows a back view of a micromirror device 110 in accordance with an embodiment of the present invention. The micromirror device 110 includes a frame portion 112, an intermediate gimbal portion 114 and an inner mirror portion 116, with the frame portion 112, gimbal portion 114 and mirror portion 116 preferably being formed from one piece of crystalline material, such as silicon. The micromirror device 110 includes a plurality of truss members 140 disposed beneath the mirror portion 116. Preferably, a plurality of truss members 142 are also disposed beneath the gimbal portion 114.

The structure 110 comprises a single sheet of material that includes the mirror portion 116 and gimbal portion 114, with a honeycomb-like structure comprising the trusses 140/142 disposed beneath the mirror portion 116 and gimbal portion 114. The truss members 140/142 mechanically support the mirror portion 116 and gimbal portion 114, respectively, so that the thickness of the one-piece crystalline material may be thinner than in prior art micromirrors. Truss members 140/142 preferably comprise crystalline silicon, and preferably have an aspect ratio (height to width ratio) of between about 5:1 and 10:1, for example.

A large micromirror device 110 may be manufactured with truss members 140/142 in accordance with an embodiment of the present invention, e.g., ranging from 1 mm×2 mm up to around 3×4 mm in width and length, or greater. The mirror portion 116 and gimbal portion 114 preferably comprise about 10 micrometers thick of crystalline silicon, for example. The truss members 140/142 are preferably 100 micrometers in height and 10 micrometers in width, for example. Because the mass of the moving parts of the micromirror 110, e.g., mirror portion 116 and gimbal portion 114, is reduced, resonant frequencies of the mirror portion 116 of embodiments of the invention are increased, and may be in the order of thousands of Hertz., e.g. 1000–3000 Hz, for example.

The truss members 140/142 may be arranged in a wide variety of shapes. In the embodiment shown in FIG. 2, mirror portion truss members 140 include truss members 140a that are positioned in a triangular shape, much like the support trusses for a bridge. Triangles are a preferred arrangement for truss members 140/142 because of the excellent mechanical support provided by a triangular structure. Some of the truss members 140b/140c, may be positioned along the first and second axis 120/124, respectively, as shown.

Similarly, the truss members 142 for the gimbal portion 114 are also preferably arranged to form a plurality of triangles. In particular, gimbal portion 114 may include truss members 142a and 142b that are substantially aligned in parallel with the edges of the gimbal portion 114, as shown. Truss members 142c may be disposed proximate truss members 142a/142b, to form a plurality of triangles there between, for example. Furthermore, truss members 142 may include curved truss members 142d that are designed to leave room for magnets 126, not shown.

While the truss members 140/142 shown in FIG. 2 are primarily shown being disposed in triangular patterns, alternatively, the truss members 140/142 may comprise and may be arranged in other shapes, such as square, rectangular, oval, circular, diamond, as examples.

Figure 3:
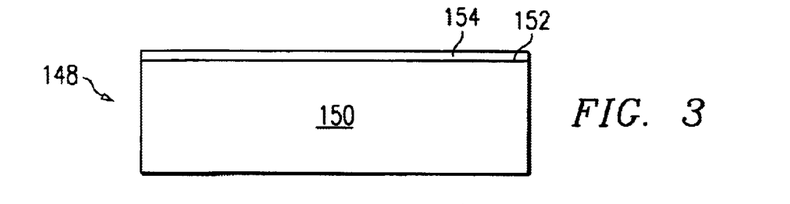
FIGS. 3 through 8 illustrate cross-sectional views of the micromirror device at various stages of fabrication in an embodiment of the invention.

FIGS. 3 through 8 illustrate cross-sectional views of the micromirror device 110 at various stages of fabrication according to an embodiment of the present invention. A bonded silicon on insulator (SOI) wafer 148 is provided, as shown in FIG. 3. The SOI wafer 148 may comprise a thin layer 154 comprising a crystalline semiconductor material such as silicon bonded to a thick layer 150 comprising a crystalline semiconductor material such as silicon, for example. Preferably, thin layer 154 is 3–10 micrometers thick, and thick layer 150 is around 500 micrometers thick, for example. The thickness of thin layer 154 may depend on how flat the mirror portion 116 needs to be.

A thin oxide layer 152 comprising one micrometer of silicon dioxide, for example, is disposed between the thin and thick silicon layers 154/150. Preferably, in accordance with embodiments of the invention, the SOI wafer 148 comprises thin and thick layers 154/150 having standard thicknesses, thus reducing manufacturing costs, because the SOI wafer 148 may be readily bought off-the-shelf from suppliers.

Figure 4:
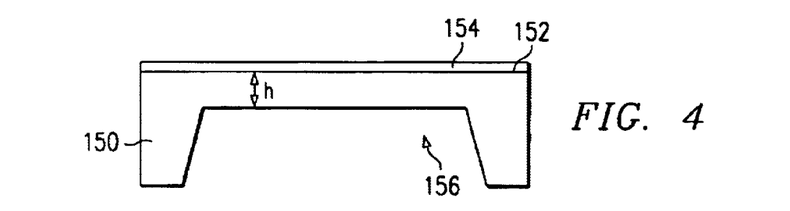

The thick layer 150 is patterned and etched in the region of the mirror and gimbal portions 116/114, to remove portions 156 of the thick layer 150, as shown in FIG. 4. The height "h" of the truss members 140/142 is defined in this processing step, with the height "h" preferably comprising 75 to 100 micrometers, for example. The backside cavity 156 for the micromirror 110 may be opened either by wet anisotropic etching or by dry etching, as examples. The depth of the etch process is determined by the length of time of the etch.

Figure 5:
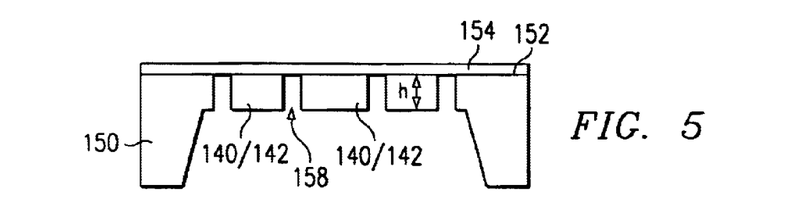

The thick layer 150 is patterned and etched to remove material in trenches 158, forming a plurality of trusses 140/142, as shown in FIG. 5. Although only three truss members 140/142 are shown in FIG. 5, a plurality of truss members 140/142 are preferably formed, as shown in FIG. 2. The truss member 140/142 pattern is preferably formed by photolithography on the back side of wafer. In this processing step, it is important to carefully coat photoresist over the large feature heights left by defining the truss member 140/142 height, and to use a photomask that compensates for the changing depth in structure resultant from the first etch process, shown in FIG. 4. One possible alternative to spin coating the photoresist on is to use electro-depositable photoresists. The truss member 140/142 pattern may be formed by reactive ion etching of the silicon 150 using the Bosch process. See U.S. Pat. No. 5,498,312 issued to Laermer et al. on Mar. 12, 1996 and assigned to Robert Bosch GmbH. The etch will stop on the buried oxide 152 later.

Figure 6:
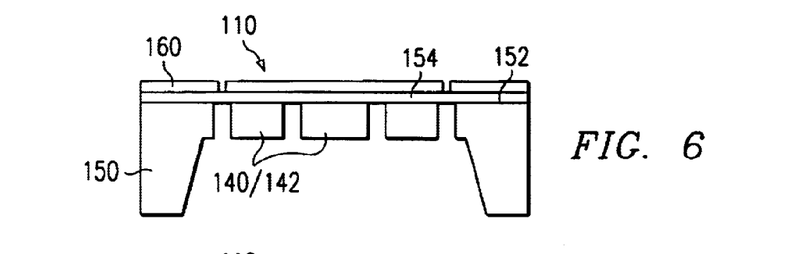
Figure 7:
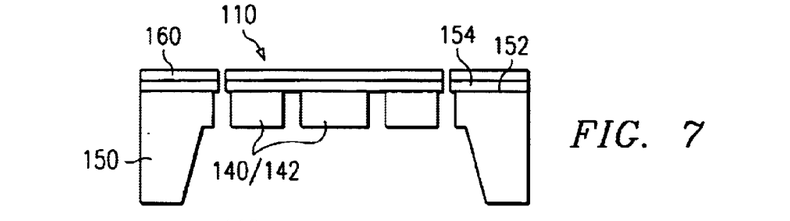

Next, the mirror portion/gimbal portion/frame portion 116/114/112 pattern is aligned to the truss member 140/142 pattern, and the mirror portion/gimbal portion/frame portion 116/114/112 pattern is etched into the thin layer 154, also preferably using the Bosch process, as shown in FIG. 6. A photoresist 160 is deposited over the thin layer 154, and a pattern for the mirror portion 116, gimbal portion 114, frame portion 112, and other features of the micromirror device 110, is formed in the resist 160. The wafer is subjected to an etch process to transfer the resist 160 pattern to the thin layer 154, as shown in FIG. 7. Portions of the oxide layer 152 may also be removed.

Figure 8:
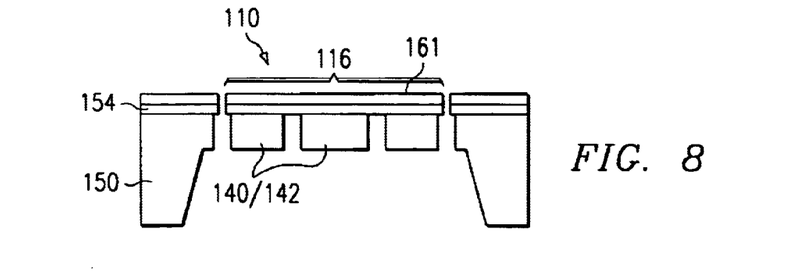

After the mirror is fabricated, an optional reflective layer 161 comprising gold or aluminum, as examples, may be deposited over at least the mirror portion 116, as shown in FIG. 8. Alternatively, the reflective layer 161 may be deposited prior to patterning the SOI thin layer 154 to form the frame portion, gimbal portion and minor portion 112/114/116, not shown.

In accordance with a preferred method of an embodiment of the present invention, a micromirror device 110 is manufactured by providing a SOI wafer having a first layer 154 bonded to a second layer 150, a thin oxide layer 152 being disposed between the first and second layers 154/150, wherein the second layer 150 is thicker than the first layer 154. A portion of the second layer 150 is removed to define a truss member height in the second layer 150, and the truss member height defined areas of the second layer 150 are patterned and etched to form a plurality of truss members 140/142. The method includes patterning and etching the first layer 150 to form a frame portion 112, a gimbal portion 114 disposed within the frame portion 112, and a mirror portion 116 disposed within the gimbal portion 114. The method may include removing portions of the thin oxide layer, and forming a reflective coating over the frame, gimbal and mirror portions. Patterning and etching the first layer 154 to form a mirror portion may comprise forming a mirror having a width of at least 2 mm on at least one side.

Figure 9:
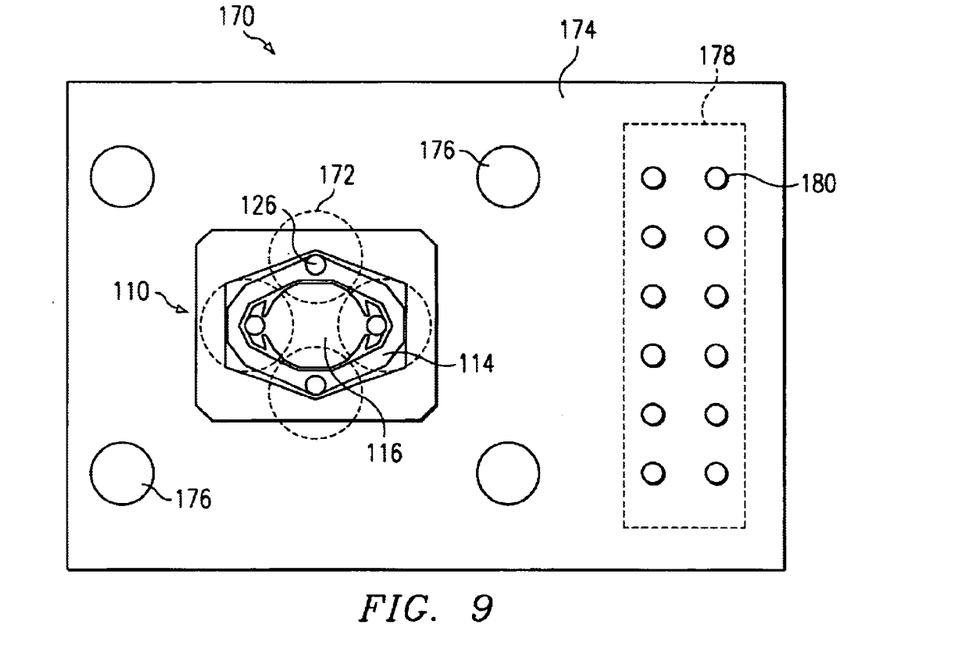
FIG. 9 shows a top view of a packaged micromirror device in accordance with an embodiment of the invention.

FIG. 9 shows a top view of a packaged micromirror device 170 in accordance with an embodiment of the invention. A substrate 174 comprising ceramic, for example, comprises a plurality of mounting holes 176 and a plurality of holes 180 adapted to receive connector 178 pins 182, shown in FIG. 10. Magnets 126 are disposed above and below the micromirror device 110 in four locations, as shown. The magnets 126 facilitate the movement of the mirror portion 116 and gimbal portion 114 of the micromirror device 110 in response to current that is run through coils 172 disposed below the micromirror device 110 magnets 126.

Figure 10:
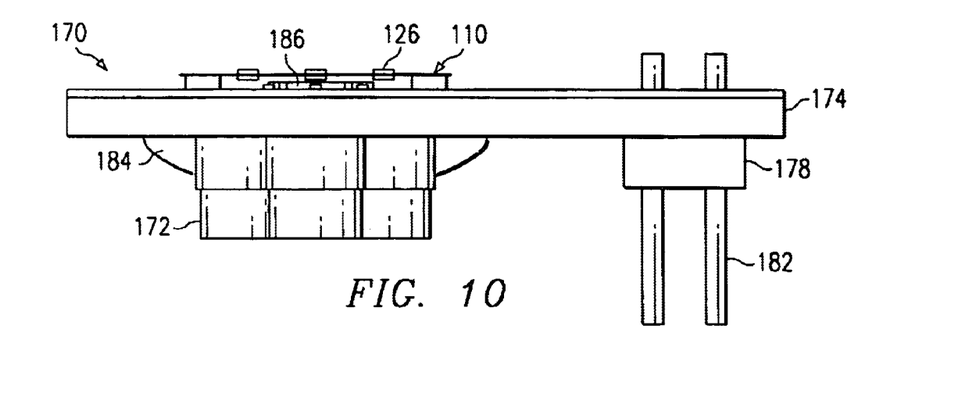
FIG. 10 shows a side view of the packaged micromirror device shown in FIG. 9.

FIG. 10 shows a side view of the packaged micromirror device 170 shown in FIG. 9. The coils 172 may be encapsulated in epoxy 184, for example, and the connector 178 may comprise a header. A feedback mechanism 186 may be disposed below the micromirror device 110.

Figure 11:
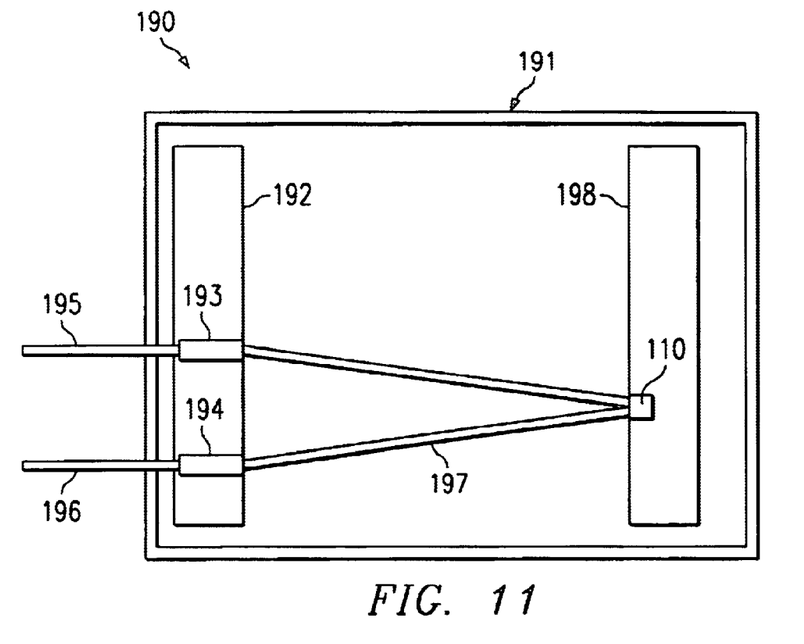
FIG. 11 illustrates an embodiment of the micromirror device used in an optical switching station.

FIG. 11 illustrates an embodiment of the microminor device 110 implemented in an optical switching station 190. The micromirror device 110 is disposed within an array 198 of a plurality of micromirrors 110. The layout of a matrix optical switch station 190 comprises a plurality of parallelly-extending optical switch units 193 and 194. While two optical switch units 193/194 are shown for the purposes of illustration, alternatively, any number of optical switch units 193/194 may be provided, as desired. Optical switch units 193/194 are mounted in a frame 192 such that they are aligned with an optical switch micromirror device 110 in accordance with embodiments of the invention, the micromirror device 110 being fixedly mounted in housing 191. An end portion of fiber optics cable 196 is mounted in a selected fixed position within housing 191 to optical switch 194. Similarly, fiber optics cable 195 is affixed within the housing 191 to optical switch 193. An optical signal 197 is transmitted in cable 196 and is directed by optical switch unit 194, by reflecting optical signal 197 from optical switch mirror 110 to another selected optical switch unit, such as optical switch 193, which directs optical signal 197 into cable 195. Because the micromirror device 110 has a high resonant frequency, switching may be faster than when using prior art micromirror devices.

While embodiments of the present micromirror device are described herein with reference to optical switches, they also have useful application in other micromirror applications, such as laser printers, scanners, and displays, as examples. Embodiments of the invention are particularly useful in micromirror devices greater than 1 mm in size along either side.

Embodiments of the present micromirror device invention provide several advantages over prior art micromirrors. The placement of trusses 140/142 on the back of the mirror portion 116 and/or gimbal portion 114 of the micromirror device 110 allows a thinner amount of silicon to be used for the moveable portions of the micromirror device 110, in particular, the mirror portion 116 and/or gimbal portion 114. The trusses 140/142 provide support, and therefore, more material may be removed from the back of the mirror portion 116 and gimbal portion 114.

Because the mirror portion 116 and gimbal portion 114 have a reduced thickness, e.g., one-tenth the thickness of prior art micromirror devices, the micromirror device 110 has lower mass moment of inertia and a higher resonant frequency, e.g. in the order of thousands of Hertz. This micromirror 110 with a truss support structure will allow very large area mirrors to be fabricated with the highest possible resonant frequencies, e.g. up to 5 mm width per side. The resonant frequency of the micromirror 110 is increased by reducing the mass moment of interia of the mirror and gimbal portions 116/114. This is especially important for large silicon mirrors (diameters>2 mm) for which the resonant frequency is on the order of normal building and shipping vibrations.

When the mirror portion comprises a mirror having a width of at least 2 mm on at least one side, embodiments of the present micromirror 110 having a plurality of truss membranes 140/142 disposed beneath the mirror and gimbal portions 116/114 are particularly advantageous in fiber optic switches, fiber optic networks, optical wireless communications, scanners, and/or other micromirror applications. In particular, in scanner applications, getting the resonant frequency up into the kiloHertz range is important which is achievable with embodiments of the present invention. Furthermore, for optical wireless, micromirrors 110 having relatively large mirrors 116, e.g., (diameters>2 mm) are important.

Furthermore, standard bonded SOI wafers, e.g., having 1–10 micrometer-thick SOI layers, may be used to fabricate embodiments of the present micromirror device 110, rather than having to use special order 115 micron bonded SOI wafers, as is currently required in the manufacture of many micromirror devices.

While the invention has been described with reference to illustrative embodiments, this description is not intended to be construed in a limiting sense. Various modifications in combinations of the illustrative embodiments, as well as other embodiments of the invention, will be apparent to persons skilled in the art upon reference to the description. In addition, the order of process steps may be rearranged by one of ordinary skill in the art, yet still be within the scope of the present invention. It is therefore intended that the appended claims encompass any such modifications or embodiments. Moreover, the scope of embodiments of the present application is not intended to be limited to the particular embodiments of the process, machine, manufacture, composition of matter, means, methods and steps described in the specification. Accordingly, the appended claims are intended to include within their scope such processes, machines, manufacture, compositions of matter, means, methods, or steps.

What is claimed is:

1. A micromirror device, comprising:
   an outer frame portion;
   a rotational gimbal portion hinged to the frame portion and moveable relative to the frame portion about a first axis;
   an inner rotational mirror portion having a reflective upper face surface hinged to the gimbal portion for movement of the mirror portion relative to the gimbal portion about a second axis; and
   a plurality of truss members disposed beneath at least the inner rotational mirror portion, said mirror portion and said truss members are formed from a first layer and a second layer, with a thin oxide layer disposed between said first and second layers, portions of said second layer removed to form said truss members and portions of said first layer forming said mirror portion.

2. The micromirror device according to claim 1, wherein the truss members are arranged to form a plurality of triangular-shaped trusses.

3. The micromirror device according to claim 1, wherein the mirror portion is 1 mm×2 mm or greater.

4. The micromirror device according to claim 3, wherein the micromirror device has a resonant frequency of between about 1000 to 3000 Hertz.

5. The micromirror device according to claim 1, wherein the truss members comprise single crystal silicon having a height of between about 75 to 100 μm.

6. The micromirror device according to claim 5 wherein the truss members have an aspect ratio of between about 5:1 to 10:1.

7. The micromirror device according to claim 1, further comprising an oxide disposed between the mirror and the truss members.

8. The micromirror device according to claim 1, further comprising a plurality of truss members disposed beneath the gimbal portion.

9. The micromirror device according to claim 1, wherein the frame, gimbals, and mirror portions are formed from a single piece of material.

10. The micromirror device according to claim 1, wherein the mirror, frame and gimbal portions are approximately 10 μm thick.

11. The micromirror device according to claim 1, further comprising at least one magnet attached to one of the rotational portions.

12. The micromirror device according to claim 11, further comprising at least one pair of magnets, each of the pair of magnets positioned opposite each other on a top and bottom face of the gimbal portion, the magnet pairs adapted to symmetrically distribute the pair of magnet's mass about an axis of rotation between the frame and gimbal portions.

13. The micromirror device according to claim 12, further comprising a pair of magnets positioned opposite each other on a top and bottom face of the mirror portion, to symmetrically distribute the pair of magnet's mass about an axis of rotation between said gimbal and mirror portion.

14. The micromirror device according to claim 1, wherein the mirror portion comprises a mirror having a width of at least 2 mm on at least one side.

15. The micromirror device according to claim 14, wherein the micromirror device may be utilized in fiber optic switches, fiber optic networks, optical wireless communications, scanners, and/or other micromirror applications.

16. An optical switch including a micromirror device of claim 1.

17. A micromirror device, comprising:
an outer frame portion;
a rotational gimbal portion hinged to the frame portion and moveable relative to the frame portion about a first axis;
an inner rotational mirror portion having a reflective upper face surface hinged to the gimbal portion for movement of the mirror portion relative to the gimbal portion about a second axis; and
a plurality of truss members disposed beneath the inner rotational mirror portion and the gimbal portion, wherein at least the gimbal portion and mirror portion are formed from a single piece of material, said single piece of material has a first layer and a second layer, with a thin oxide layer disposed between said first and second layers portions of said second layer removed to form said truss members and portions of said first layer forming said mirror portion.

18. The micromirror device according to claim 17, wherein the truss members are arranged to form a plurality of triangular-shaped trusses.

19. The micromirror device according to claim 17, wherein the mirror portion is 1 mm×2 mm or greater.

20. The micromirror device according to claim 17, wherein the micromirror device has a resonant frequency of between about 1000 to 3000 Hertz.

21. The micromirror device according to claim 17, wherein the truss members comprise single crystal silicon having a height of between about 75 to 100 μm.

22. The micromirror device according to claim 17, wherein the truss members have an aspect ratio of between about 5:1 to 10:1.

23. The micromirror device according to claim 17, further comprising an oxide disposed between the mirror and the truss members.

24. The micromirror device according to claim 17, wherein the mirror, frame and gimbal portions are approximately 10 μm thick.

25. An optical switch comprising a micromirror device of claim 17.

26. An optical switching station comprising a micromirror device of claim 17.

27. A method of manufacturing a micromirror device, the method comprising:
providing a silicon on insulator (SOI) wafer having a first layer bonded to a second layer, a thin oxide layer being disposed between the first and second layers, wherein the second layer is thicker than the first layer;
removing a portion of the second layer to define a truss member height in the second layer;
patterning and etching the truss member height defined areas of the second layer to form a plurality of truss members; and
patterning and etching the first layer to form a frame portion, a gimbal portion disposed within the frame portion, and a mirror portion disposed within the gimbal portion.

28. The method according to claim 27, further comprising removing portions of the thin oxide layer.

29. The method according to claim 27, further comprising forming a reflective coating over the frame, gimbal and mirror portions.

30. The method according to claim 27, wherein patterning and etching the first layer to form a mirror portion comprises forming a mirror having a width of at least 2 mm on at least one side.

* * * * *